United States Patent [19]

Wyttenbach

[11] Patent Number: 4,533,176
[45] Date of Patent: Aug. 6, 1985

[54] BUILT-IN AUTOMATIC INFANT RESTRAINT SEAT

[76] Inventor: Bill Wyttenbach, Rte. 5, Wheeler Rd., WL #12, Louisville, Tenn. 37777

[21] Appl. No.: 516,208

[22] Filed: Jul. 21, 1983

[51] Int. Cl.³ .............................................. A47C 15/00
[52] U.S. Cl. ...................................... 297/238; 297/14; 297/15
[58] Field of Search ..................... 297/238, 488, 14, 15

[56] References Cited

U.S. PATENT DOCUMENTS

| 1,805,189 | 5/1931 | Rothe | 297/238 |
| 2,584,481 | 2/1952 | Mast et al. | 297/115 |

FOREIGN PATENT DOCUMENTS

| 3020212 | 12/1981 | Fed. Rep. of Germany | 297/488 |
| 24950 | of 1908 | United Kingdom | 297/14 |

Primary Examiner—Kenneth Downey
Attorney, Agent, or Firm—James C. Kesterson

[57] ABSTRACT

A combination child's seat and adult seat for use in a vehicle is disclosed. The combination comprises a seat member (10) a frame (12) and a contact portion (18) secured to the frame (12) for receiving and contacting the body of a seated adult. Also included is a child's seat (52) which is movably secured to the support frame (12). A restraining means which may include a restraining bar (82) or a restraining belt (87), movably cooperates with the child's seat (52) and with the support frame (12) and contact portion (24) of the vehicle seat such that the child's seat is movable to a first position wherein the restraining members and the child's seat are concealed by the contact portion (24) of the seat and the seat is suitable for occupancy by an adult, and movable to a second position when the child's seat (52) is accessable and available for use by a small child and the restraining means (92, 87), are suitable for restraining the child in the child seat (52) against substantial impact forces.

12 Claims, 8 Drawing Figures

BUILT-IN AUTOMATIC INFANT RESTRAINT SEAT

DESCRIPTION

1. Technical Field

This invention relates generally to automobile seats used by infants, and more particularly to an infant restraining and protective seat which is built into the seat of an automobile such that the automobile seat may both be used by an adult and by an infant or small child. The infant seat is securely mounted to the structure or frame of the automobile and the device includes both restraining bars and harnesses or belts to assure that the child will not be thrown or ejected from the seat even upon the occurrence of substantial impact forces. The seat is particularly appealing in that when not needed by a small child or infant, it may be folded completely away and the seat used in comfort by an adult.

2. Background Art

There have been many types of small child and infant seats for use with an automobile which have been available commercially for a long time. Most of these types of seats were completely detachable from the automobile seat, and simply placed on the seats or minimumly secured to assure that they did not move around on the seat. However, there have been other types of infant or small child automobile seats which are built in and for which patent protection has been granted. However, a review of all the prior art discloses that each of these built in automobile seats are only concerned with the matter of convenience. That is, none of the patents disclose a seat designed to provide effective protection to an infant or small child in the event of a collision.

For example, U.S. Pat. No. 2,337,480 issued to M. T. Logan on Dec. 21, 1943, simply shows a fold out cushion for the child to sit on and a small closing ring which drops down around the child to keep the child from leaving the seat. However, it is clear, that the enclosing ring of the Logan patent in no way protects the child in case of an automobile collision.

In a similiar manner, U.S. Pat. No. 2,436,294 issued to B. Glatstein on Feb. 17, 1948, proposes a device which will operate either as a seat or as an infant bed. However, it is of great importance to note that this patent only shows a small holding belt to discourage the child from leaving the seat. The belt disclosed in this patent could not in any way protect the child from the forceful impact of an automobile collision.

U.S. Pat. No. 2,584,481 issued to G. M. Mast, et al, on Feb. 5, 1952, on the other hand, shows a seat which includes fold down arms and which may be very comfortable for the child to set in. However, as was the case with the previously discussed patents, the prior art discloses no restraining belt or bars whatsoever to protect the child. That is, the child could even jump out the seat whenever he wishes and certainly would not be restrained in the event of forces resulting from an automobile collision.

U.S. Pat. No. 2,966,201 issued to L. W. Strahler on Dec. 27, 1960, shows a restraining belt for a reclining infant, and a small belt for an infant seating in the seat. However, a quick review of this patent discloses that the belts were in no way intended to protect the child or the infant in the event of substantial impact forces resulting from an automobile collision. Thus, it is seen that the prior art of small child or infant seats was exclusively concerned with the convenience of having a seat which the child could set in and from which the child would be comfortable. However, little or no consideration was given to the prior arts seats so far as providing a seat for truly and effectively protecting the child.

However, it is now public knowledge that the automobile accident is the leading cause of death and serious injury for all children beyond one month of age. It is also common knowledge that substantially all children under the age of four ride in automobiles without any protection whatsoever. Because of their anatomy, however, children under the age of four cannot be positioned safely in an adult lap belt and tragically such children in a crash often become flying missiles which are highly vulnerable to serious injury. There is an answer to this in that child restraint systems have been shown to reduce the chances of death for such children by over 90 percent and serious injuries by almost 80 percent. Therefore, to encourage the use of such restraint systems, several states including Tennessee, have passed legislation to protect the young automobile passenger from death and serious injury. Unfortunately, enforcement of the legislation is most difficult, and therefore any technique which would make compliance to the laws and legislation easier would be most valuable.

Research has shown, that there are virtually only four types of infant restraints which are effective, and these vary for different age infants or children. For example, the infant car carriers are designed to face rearward and the infant lays in a simi-reclined position and is secured within the carrier with a harness. The carrier itself is secured to the vechicle with a lap belt. The infant carrier is designed to be used with children under twenty pounds.

Another unique device is the "C" shaped shield which is designed to catch the child's body in the event of a crash. The shield cushions and distributes the child's weight over a larger area and is itself restrained in place by means of a typical adult lap belt. The shield is advantageous in that it requires no harness except for the lap belt and is quite effective. Unfortunately, this shield can only be used by children of twenty pounds or over and who can set without support.

The car seat is basically a traditional car seat except one suitable for protecting a child in the event of a collision is substantially stronger and typically includes a harness system of shoulder straps, a lap belt and a crotch strap. The seat of the traditional car seat is itself secured to the vehicle with the vehicle lap belt. The most discouraging part of the traditional car seat is that it is difficult to install or remove from the vehicle if circumstances require. As was the case with the shield, the car seat is also only suitable for children over twenty pounds who are able to sit without support.

Finally, there is a child harness which is typically used for children who are not yet adults, yet who because of their undeveloped anatomy, still require the additional restraint of shoulder harnesses, seat belts and a crotch strap. Although all of the above discussed devices do protect children, the infant care and car seat discourage their own use in that they are difficult to place and remove from the car. The shield is easy to install but still when not being used it is bulky and takes up considerable space. On the other hand, although the harness takes little or no room and is easy to work with, it is not suitable for very small children and infants.

Therefore, it is an object of the present invention to provide a restraining device suitable for infants and small children that is easy and simple to use.

It is still another object of the present invention to provide a restraining device which may be readily used by a small child and which may be quickly and easily folded out of the way such that the seat may also be used by an adult when a small child is not present.

It is yet another object of the present invention to provide a restraining device which may be used by both infants which cannot set up without support and small children who may tend to be active.

Still another object of the present invention is to provide a restraining device for small children and infants that can be completely folded out of the way without taking up additional space in the automobile.

DISCLOSURE OF THE INVENTION

Other objects and advantages will in-part be obvious, and will in-part appear hereinafter, and will be accomplished by the present invention which discloses a vehicle seat for adults having in combination therewith a fold away infant protection and restraining seat. The combination seat comprises a seat member suitable for supporting an adult person in a moving vehicle, and includes a support frame secured to the structure of the vehicle and a contact or padding portion secured to the support frame for receiving and supporting the body of the seated person. Also included is a child's body support means movably secured to the support frame of the seat. In addition, there is a restraining means also secured to the support frame. The support means and restraining means cooperate with each other and the support frame of the seat and the padding or contact portion of the seat to provide a child's seat. The child's seat is movable to a first position so that the child's body support means and the restraining means are concealed by the padding or contact portion of the adult seat such that the seat is suitable for occupancy by an adult. Alternately, the child's seat is movable to a second position wherein the child's seat is accessible and available for use by a small child and wherein the restraining means and the child's body support means are suitable for restraining the child or infant in the child's seat against substantial impact forces. In a perferred embodiment, the support frame includes a back support and the contact portion includes a back portion having a front section and a rear section. The rear section is secured to the back support frame and the front section is movably attached to the rear section and the child seat is located between the front and rear section when the seat is in the first position. The front section is then suitable for moving away from the back section to reveal the child's seat such that the child's seat may then be placed in the second position and suitable for protecting and restraining a small child or infant. Although several restraining members or techniques may be used, it will be appreciated that a restraining belt suitable for all types of individual infants and small children is preferable.

BRIEF DESCRIPTION OF THE DRAWINGS

The above-mentioned features of the present invention will be more clearly understood from the consideration of the following description in connection with accompanying drawings in which.

BEST MODE FOR CARRYING OUT THE INVENTION

Figure 1:
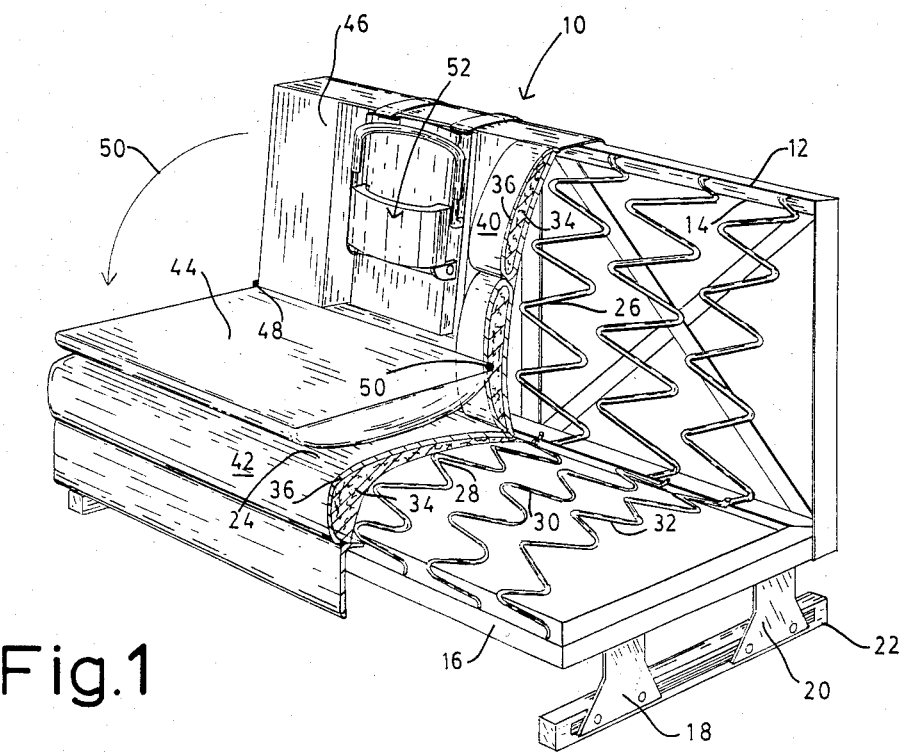
FIG. 1 is a perspective view of a typical bench front seat of an automobile having a cut away section.

Referring now to FIG. 1, there is shown generally at 10 a perspective and cut away view of a typical bench front seat of an automobile. As shown, seat 10 is typically suitable for supporting an adult in a moving vehicle and includes a support frame 12, having a back portion 14 and a seat portion 16, which frame 12 is itself suitably secured by means of support members 18 and 20 to the structure and frame 22 of the automobile itself. As shown, the frame 12 also includes a contact portion 24 which provides the occupant support for setting and resting their back against. Typically, the contact portion 24 will include a series of springs 26, 28, 30 and 32 which in turn support a padding material 34 which itself is enclosed by a cover 36 such as vinyl, leather, velour, or the like. Contact portion 24 includes a back contact portion 40 and a seat contact portion 42 for receiving and supporting the buttocks and back of an individual. In the combination seat of the present invention, however, according to one invention, back contact portion 40 includes a front section 44 and a rear section 46. Rear section 46 is itself secured to the back frame 14 as was discussed hereinabove. Front section 44, on the other hand, is movably attached to the frame 14 such as shown at pivot points 48 and 50, or may alternately simply be attached to the rear section 46 itself. In any event, the front section 44 can be swung away from its normal position proximate the back contact frame 14 in a direction indicated by acutate arrow 50 to a position which reveals the child's seat generally indicated at 52. As shown, the child restraining and support device or child's seat 52 is in a folded condition such that the front section 44 of back contact portion 40 may be folded into place. Details of the child's seat 52 and its operation will be discussed hereinafter.

Figure 2:
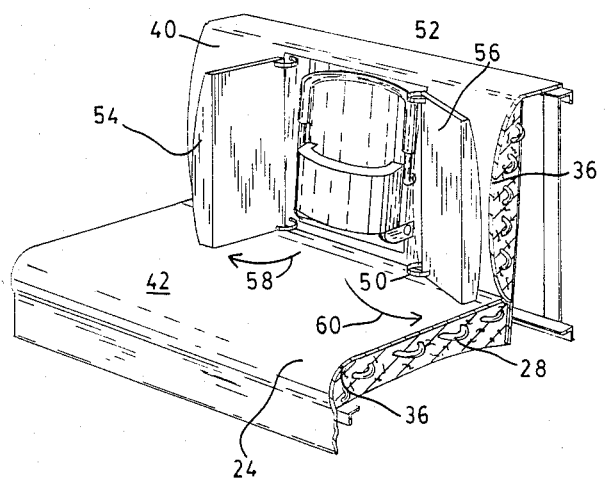
FIG. 2 proposes an alternate embodiment of the device of this invention.

Referring now to FIG. 2, there is shown an alternate embodiment of the combination adult and child's seat of this invention. It will be appreciated that elements of this embodiment of FIG. 2 which are the same or substantially the same of those of the embodiment disclosed and discussed with respect to FIG. 1, will carry the same reference numbers. Likewise, other figures which show still other embodiments will carry common references where the parts or components are the same. As shown in FIG. 2, back contact portion 40 includes two panels 54 and 56 both of which are hinged so that they rotate away from the center of the contact position 40 as indicated by arcuate arrows 58 and 60 to reveal the child's seat 52. The use of the left and right panel foldouts as shown in FIG. 2, not only allows the seat 52 to become accessible for use by the small child or infant, but may be specifically designed to provide additional protection to the child against impact or forces coming from the left or right side of the vehicle. Although the technique for concealing and for accessing the child's seat 52 are different in FIGS. 1 and 2, it will be appreciated that the operation of the child's seat itself will be substantially the same and will be discussed in the following paragraphs.

Figure 3:
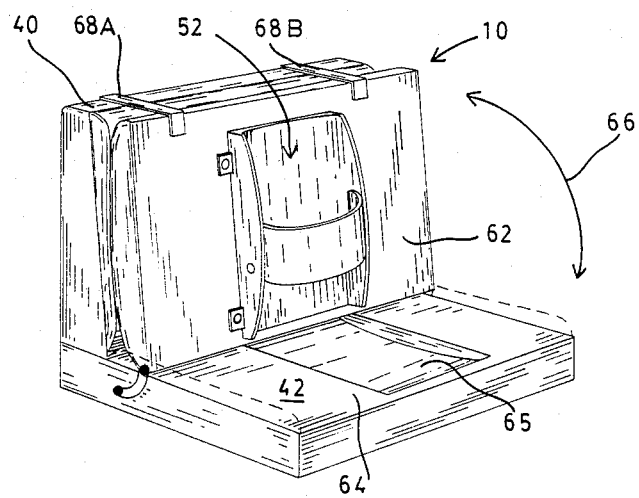
FIG. 3 shows still a second alternate embodiment of the device of this invention.

Referring now to FIG. 3, there is shown still a third embodiment for concealing the child seat 52 such that the vehicle seat may be occupied by an adult. As shown, instead of the back contact portion 40 being separated into two sections, the seat contact portion 42 is separated into a top section 62 and a bottom section 64. The infant or child's seat 52 itself is contained in the top section and this top section 62 is pivotally secured to the frame 14 such that it rotates in a manner indicated by arcuate arrow 66 to a raised position as indicated in FIG. 3. This particular embodiment also clearly requires the use of substantial restraining members such as hooks 68A and 68B to assure that the section 62 will remain in the unfolded position in the event of an automobile collision. Depending on the amount of padding in the control portion 62, it may be advantageous to provide a well 65 in bottom section 64 to receive seat 52. Such a well 65 could also be provided in the embodiments of FIGS. 1 and 2, of course. However, as can be seen once the section 62 is rotated in the position to reveal the child's seat 52, the child's seat itself operates in a manner as discussed above and as will be discussed in detail in the following paragraphs.

Figure 4:
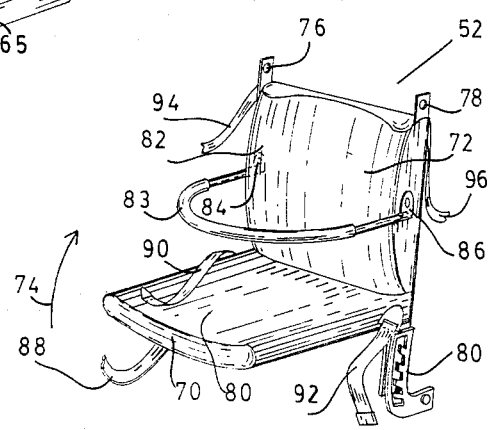
FIG. 4 shows the details of the infant support and restraining device in combination with the seats shown in FIGS. 1, 2 or 3.
Figure 5A:
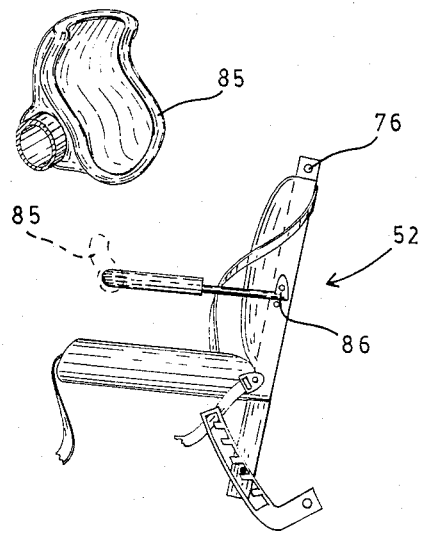
FIGS. 5 and 5B show the support and restraining device of this invention suitable for use with an infant and a small child, respectively.
Figure 5B:
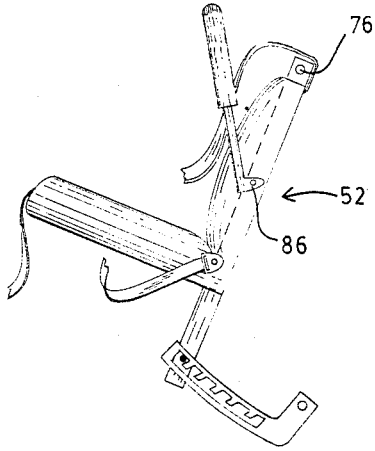

Referring now to FIG. 4, there is shown a seat in perspective which also reveals details of the child's seat 52 which is suitable for use in the embodiments of FIGS. 1, 2 and 3 discussed hereinabove. As shown, the child's seat 52 includes a seat 70 and a back 72. As can be seen in the embodiment, seat 70 is securely and pivotally attached to back 72 such that seat 70 may be folded into back 72 as indicated by arcuate arrow 74 and FIGS. 1, 2 and 3. In addition, it can be seen that back 72 includes pivot points 76 and 78 which secure the top of the child's seat 52 securely to the back frame 14 of the vehicle seat. In addition, there is shown a rack member 80 which allows the child's seat 52 to be located in two or more position such as shown in FIGS. 5A and 5B. It will also be appreciated that accordingly to preferred embodiments of the present invention, the child's seat 52 may include padding 82 and 84 which cooperate with the back 72 and seat 70, respectively, for providing some comfort to the seated child.

Figure 6:
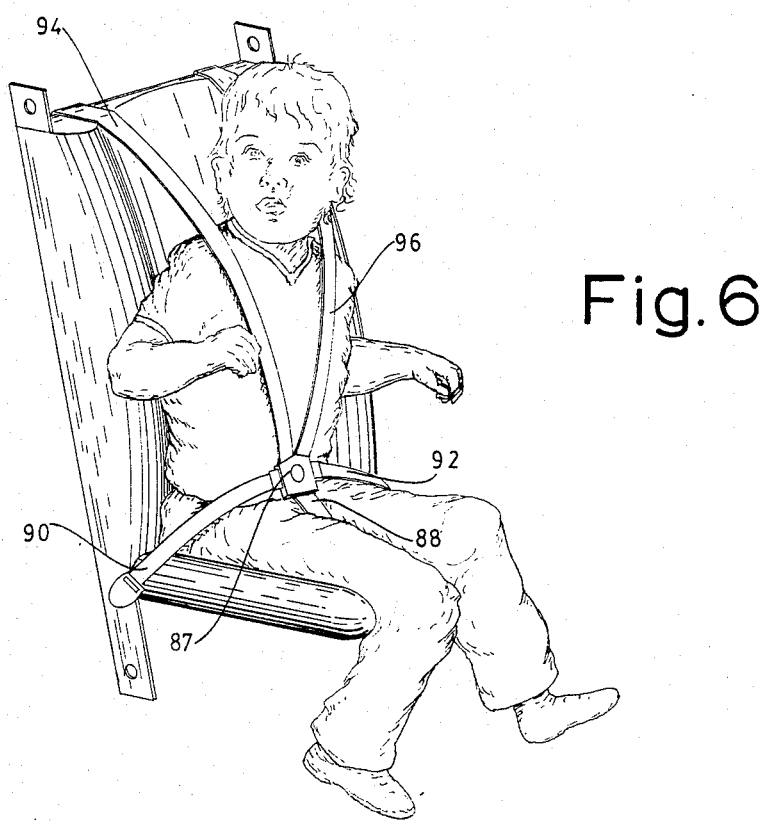
FIG. 6 shows a typical harness suitable for use with the device of this invention.

As shown in FIGS. 5A and 5B, and as was discussed with respect to FIG. 4, seat 52 may be positioned in at least two positions such as the position shown in FIG. 5A which is primarily suitable for the child which can sit without support. As can be seen, the position of the seat shown in FIG. 5A is located at a normal slant similar to an adult seat. As shown in FIG. 5B, the seat 52 is rotatated out from the back of the seat around pivot points 76 such that the seat is in a semi-reclined position. The position of the seat shown in 5B is particularly suitable for use by small infants or children who cannot set without support. Also as shown in FIG. 4 and by dotted lines in FIGS. 5A and 5B, there may well be included a restraining bar 82 which pivots and rotates around pivots 84 and 86 as the bar is lowered in front of the seated child. As shown, restraining bar 82 is itself securely attached to the frame 14 of the vehicle car seat or the child's seat 52 itself which of course as discussed above is secured to the vehicle car seat. The use of restraining bar 82 also provides a support means for including a resiliant support means 85 for catching and receiving the face and head of a small child without causing injury upon the occurance of substantial impact forces. However, even though a restraining bar 82 may be desired, it will be appreciated by those skilled in the art that a restraining belt is still one of the most effective means of restraint for both adults, small children and infants. The only difference being, that the belt suitable for use by small children and infants must be attached differently than that for an adult. To this end, there is shown in FIG. 6, the typical restraining belt 87 arrangement for a small child or infant which includes a crotch portion 88, a seat belt portion 90 and 92, and two shoulder straps 94 and 96. It will be appreciated that these straps are each strongly secured to either the child's seat 52, or preferably even to the frame 12 of the vehicle seat.

Figure 7:
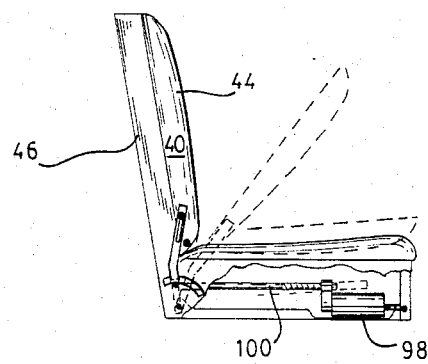
FIG. 7 discloses the use of linkages, and drive mechanism for automatically positioning the child's seat in an accessible position and a concealed position.

Further, although not considered to be critical to the present invention, it will be appreciated that there are many accessories to modern day automobiles. Consequently, the child restraint and protection seat of this invention in combination with the adult vehicle seat may include linkages and drive mechanisms such that the seat is positioned and made available for use by the child by the simple pushing of a button. For example, as shown in FIG. 7 there may be included small drive motors such as drive motor 98 and connected to linkage or drive screw 100 to rotate the front section 44 of contact portion 40 to reveal the child's seat. Similarly, there may also be included similar drive mechanisms and linkages to rotate the child's seat 52 into position for receiving and protecting the small child.

Thus, although the present invention has been described with respect to specific designs and embodiments for providing a combination infant and adult vehicle seat, it is not intended that such specific references be considered as limitations upon the scope of this invention except in so far as set forth in the following claims.

I claim:

1. A vehicle seat for adults in combination with a foldaway infant protection and restraining seat, said combination seat comprising:
   a seat member suitable for supporting an adult person in a moving vehicle including a support frame with a back portion secured to the structure of said vehicle, and a contact portion including a back contact portion having a front section and a rear section, said rear section secured to said back support frame for receiving and contacting the body of a seated person, and said front section of said contact portion being rotatably attached to one of said rear section and said back support frame including a section rotatable to between a first location and a second location;
   a restraining means secured to said support frame; and
   a child's seat movably secured to said support frame, said child's seat and restraining member movably cooperating with each other and said support frame and said rotatable section of said contact portion of said seat member to provide a first position wherein said child's seat and said restraining member are concealed between said front and rear section by said front rotatable section of said contact portion being in said first location and said seat member is suitable for occupancy by an adult, and said child's seat movable to a second position whereby wherein said front rotatable section of said contact portion is moved away from said rear section to in said second location and said child's seat is accessible and available for receiving and protecting use by a small child, and wherein said restraining means and said child's seat are suitable for restraining a child in said child's seat against substantial impact forces.

2. The combination vehicle seat of claim 1 wherein said restraining means is a belt secured to said support frame for snuggly encircling a child located in said child's seat to prevent such a child from being thrown from said child's seat upon the occurance of substantial impact forces.

3. The combination vehicle seat of claim 1 wherein said restraining means comprises a bar member located in front of such a child and a belt for encircling said child located in said child's seat, said bar and said belt for preventing such a child from being thrown from said child's seat upon the occurance of substantial impact forces.

4. The combination seat of claim 1 and wherein said rear section of said back contact portion defines a cavity for receiving said child's seat such that said child's seat may be folded into said rear section when said combination seat is in said first position.

5. The combination seat of claim 1 wherein said front section comprises a left and right portion which left and right portions rotate away from said back portion to reveal said child's seat and to provide side protective panels to said child's seat.

6. The combination seat of claim 1 further including control linkages, and drive mechanisms for automatically moving said child's seat from one of said first and second positions to the other of said first and second positions.

7. combination seat of claim 1 wherein said restraining means further includes a face and head protection means for resiliently catching a child's head thrown forward upon the occurance of substantial impact forces 8. The combination of claim 4 wherein said restraining means comprises a rotatable bar member located in front of such a child and a belt for encircling said child and wherein said rear section further defines another cavity for receiving said restraining bar.

9. The combination seat of claim 1 further including control linkages and drive mechanisms for automatically moving said child's seat from one of said first and second positions to the other of said first and second positions.

10. The combination seat of claim 1 wherein said restraining means further includes a face and head protection means for resiliently catching a child's head thrown forward upon the occurence of substantial impact forces.

11. The combination seat of claim 1 wherein said seat and back portion of said child's seat are rotatably attached to each other such that said seat portion may fold toward and substantially against said back portion so as to occupy less space.

12. A vehicle seat for adults in combination with a foldaway infant protection and restraining seat, said combination seat comprising:
a seat member suitable for supporting an adult person in a moving vehicle including a support frame with a lower support frame secured to the structure of said vehicle, and a contact portion including a lower contact portion having a top section and a bottom section, said rear section secured to said lower support frame for receiving and contacting the body of a seated person, and said top section of said contact portion being rotatably attatched to one of said bottom section and said lower support frame between a first location and a second location;
a restraining means secured to said support frame; and
a child's seat movably secured to said support frame, said child's seat and restraining member movably cooperating with each other and said support frame and said rotatable section of said contact portion of said seat member to provide a first position wherein said child's seat and said restraining member are concealed between said top and bottom section by said top rotatable section of said contact portion being in said first location and said seat member is suitable for occupancy by an adult, and said child's seat movable to a second position whereby said top rotatable section of said contact portion is moved away from said bottom section to said second location and said child's seat is accessible and available for receiving and protecting a small child, and wherein said restraining means and said child's seat are suitable for restraining a child in said child's seat against substantial impact forces.

* * * * *